(12) United States Patent
Wei

(10) Patent No.: US 9,380,530 B2
(45) Date of Patent: Jun. 28, 2016

(54) DISCONTINUOUS RECEPTION METHOD, MOBILE STATION, BASE STATION AND WIRELESS COMMUNICATION SYSTEM

(71) Applicant: Sony Corporation, Tokyo (JP)

(72) Inventor: Yuxin Wei, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/796,755

(22) Filed: Jul. 10, 2015

(65) Prior Publication Data

US 2015/0319690 A1 Nov. 5, 2015

Related U.S. Application Data

(63) Continuation of application No. 13/820,640, filed as application No. PCT/CN2011/075507 on Jun. 9, 2011.

(30) Foreign Application Priority Data

Sep. 30, 2010 (CN) .......................... 2010 1 0506073

(51) Int. Cl.
*H04W 52/02* (2009.01)
*H04W 72/04* (2009.01)
(Continued)

(52) U.S. Cl.
CPC .......... *H04W 52/0212* (2013.01); *H04L 5/001* (2013.01); *H04L 5/003* (2013.01); *H04L 5/0007* (2013.01); *H04W 52/0209* (2013.01); *H04W 52/0219* (2013.01); *H04W 72/042* (2013.01); *H04W 72/0473* (2013.01); *H04W 76/048* (2013.01); *H04W 88/02* (2013.01); *H04W 88/08* (2013.01); *Y02B 60/50* (2013.01)

(58) Field of Classification Search
CPC .......... H04W 52/0209; H04W 72/042; H04W 76/048; H04W 88/02; H04W 88/08
See application file for complete search history.

(56) References Cited

U.S. PATENT DOCUMENTS

| | | | |
|---|---|---|---|
| 8,854,976 B2 | 10/2014 | Xi et al. | |
| 2010/0322173 A1* | 12/2010 | Marinier | H04W 76/048 370/329 |

(Continued)

FOREIGN PATENT DOCUMENTS

WO 2010 078365 7/2010

OTHER PUBLICATIONS

3GPP TSG RAN WG2 Meeting #68 R2-096501, "Consideration on DRX," CATT, pp. 1-4, (Nov. 9-13, 2009).

(Continued)

*Primary Examiner* — Melvin Marcelo
(74) *Attorney, Agent, or Firm* — Oblon, McClelland, Maier & Neustadt, L.L.P.

(57) ABSTRACT

A discontinuous reception method, mobile station, base station and wireless communication system are provided in the present invention. The discontinuous reception method in the wireless communication system includes the following steps: in case of a continuous carrier aggregation, setting a common On Duration timer and/or a common Discontinuous Reception inactivity timer for a primary cell and each secondary cell; and in case of a discontinuous carrier aggregation, setting an independent On Duration timers and/or an independent Discontinuous Reception inactivity timers for the primary cell and each secondary cells. The present invention realizes discontinuous reception of the carrier aggregation, thus saving power consumption of the mobile station.

20 Claims, 4 Drawing Sheets

(51) Int. Cl.
  *H04W 76/04* (2009.01)
  *H04L 5/00* (2006.01)
  *H04W 88/02* (2009.01)
  *H04W 88/08* (2009.01)

(56) References Cited

U.S. PATENT DOCUMENTS

2011/0002281 A1 1/2011 Terry et al.
2013/0136094 A1 5/2013 Wei

OTHER PUBLICATIONS

3GPP TSG RAN WG2 Meeting #66 R2-093104, "Carrier aggregation in active mode," Huawei, Total 4 Pages, (May 4-8, 2009).
3GPP TSG RAN WG2 Meeting #68 R2-096583, "Scheduling and DRX Operation for Carrier Aggregation," InterDigital, ZTE, MediaTek, Total 3 Pages, (Nov. 9-13, 2009).
3GPP TSG RAN WG2 #68 R2-097037, "Discussion of DRX Scheduling in Carrier Aggregation," ITRI, pp. 1-7, (Nov. 9-13, 2009).
3GPP TSG RAN2 Meeting #71 R2-104664, "Details of DRX operation in carrier aggregation," NEC, Total 3 Pages, (Aug. 23-27, 2010).
International Search Report Issued Sep. 29, 2011 in PCT/CN11/75507 Filed Jun. 9, 2011.
Office Action issued Sep. 5, 2014 to Korean Patent Application No. 10-2014-7016127, with English translation.
M. Iwamura et al., "Carrier Aggregation for LTE-Advanced," *IEEE Commun. Mag.*, vol. 48, No. 8, Aug. 2010. pp. 60-67.
U.S. Appl. No. 61/293,576, filed Jan. 8, 2010.
U.S. Appl. No. 61/320,648, filed Apr. 2, 2010.
U.S. Appl. No. 61/329,632, filed Apr. 30, 2010.
U.S. Appl. No. 61/355,889, filed Jun. 17, 2010.

* cited by examiner

Mobile Station 600

Mobile Station 700

```
┌─────────────┐
│ Transmitting│
│    unit     │
│    802      │
└─────────────┘
```

Base Station 800

900

DISCONTINUOUS RECEPTION METHOD, MOBILE STATION, BASE STATION AND WIRELESS COMMUNICATION SYSTEM

CROSS-REFERENCE TO RELATED APPLICATIONS

This is a continuation of U.S. patent application Ser. No. 13/820,640, filed Mar. 4, 2013, which is a National Stage Application of PCT Application No. PCT/CN2011/075507, filed Jun. 9, 2011, which claims priority to Chinese Patent Application No. 2010 10 506 073.X, filed Sep. 30, 2010. The entire contents of U.S. patent application Ser. No. 13/820,640 is incorporated herein by reference.

FIELD

The invention relates to discontinuous reception in wireless communication system, and particularly to the discontinuous reception under carrier aggregation (CA).

BACKGROUND

The future LTE-A (Long Term Evolution Advanced) system will support a transmission bandwidth up to 100 MHz, while the maximum transmission bandwidth supportable by the LTE (Long Term Evolution) standard is 20 MHz. Thus to achieve the higher transmission bandwidth, it requires to aggregate multiple carriers. Carrier aggregation (CA) is a technique of aggregating multiple carriers for combined transmission, which is proposed by 3GPP (3rd Generation Partnership Project) to meet the high transmission bandwidth requirement of the future mobile systems. Carrier aggregation may be classified into consecutive carrier aggregation and non-consecutive aggregation based on the positions of the carriers that are aggregated on the spectrum. LTE-A will support both of the two CA scenarios. While introducing the CA technique, 3GPP also considers its backward compatibility, which means that user equipments (UEs) supporting CA and UEs not supporting CA will co-exist for a long time in the future. A CA supporting UE can be connected to a plurality of component carriers (CCs) at the same time, and a UE not supporting CA can be connected to only a certain CC.

With the introduction of the CA technique, each cell may be configured with a plurality of CCs and a UE may also use multiple of CCs. Not all the UEs use all the CCs of the corresponding cell. Those CCs used by the UE are referred to as configured CCs and those not in use are called as non-configured CC. The so called configured/non-configured is defined with respect to each UE. That is, different UEs may have different configured/non-configured CCs The configured CCs may be further classified as activated CC and deactivated CC. The UE transmits data over the activated CC. No data transmission is performed over the deactivated CC. The deactivated CC does not support difficult measurements such as CQI (Channel Quality Indicator).

The advantage of introducing activated/deactivated CC lies in that, the CCs that are not in use temporarily can be set in the deactivated state so that the power of the UE may be saved. The deactivated CC may be switched into the activated state rapidly via MAC signaling, and unlike the non-configured CC, the deactivated CC can perform measurement thereon and the measurement information of the deactivated CC can be used by the base station to set related parameters. In this way, the requirements of the burst data services can be better met.

In LTE-A, each cell has a plurality of CCs and each UE can be allocated with a plurality of CCs. LTE-A defines the concept of "special cell". Each UE has only one special cell and the special cells of different UEs may be different from each other. Over the special cell, the system provides security input function and NAS (non-access) layer information to the UE. From the view point of the system, each CC is equivalent to a cell, and is allocated with globally unique cell identification. From the view point of the UE, even if the UE is allocated with a plurality of CCs, it can only see one cell, i.e. the special cell, while the other CCs are used as uplink and downlink resources.

LTE-A introduces the concept of PCC (primary component carrier). Each UE is configured with an uplink PCC and a downlink PCC. The uplink control information is transmitted over the uplink PCC. The radios link failure (RLF) information is monitored over only the primary cell (Pcell). The cell corresponding to the PCC is thus called as primary cell (Pcell), and the other cells are called as secondary cell (Scell). Pcell is the special cell.

To save the power of the mobile station, LTE Rel-8 introduces the concept of DRX (Discontinuous Reception) such that the listening of PDCCH (Physical Downlink Control Channel) is stopped when there is no data transmission over the air interface, thereby reducing the operation of the receiver, decreasing the power consumption of the mobile station and lengthening the life of the battery.

Some concepts of DRX in LTE Rel-8 are explained blow.

1. On Duration time: a UE wakes from dormant state and goes into the on duration, and starts an on duration timer. During the on duration, the UE receives the information of PDCCH. On PDCCH, there is signaling information related to the UE which is transmitted from the network side to the UE, such as control information of resource allocation, such as confirmation, power control, resource allocation and reallocation, etc. If the UE can successfully decode the information of the PDCCH signal indicating the initial uplink or downlink user data transmission, it starts a discontinuous reception inactivity timer and goes into the inactivity time; otherwise, the UE goes into the dormant state after the on duration time ends (i.e. expire of the on duration timer)

2. Inactivity time: after the UE successfully decodes the PDCCH channel, the UE starts the DRX inactivity timer and goes into the inactivity time. During the inactivity time, the UE continues listening to the PDCCH and related control channels. If the UE successfully decodes the PDCCH and related control channels before the expire of the DRX inactivity timer, the UE restarts the DRX inactivity timer and once again goes into the inactivity time; otherwise, the UE goes into the dormant time after the expire of the DRX inactivity timer, and proceeds to the next DRX cycle.

3. Active time: during the active time, the UE monitors the PDCCH channel; the on duration time and the inactivity time both belongs to the active time.

4. Dormant time: the UE is in an off state during the dormant time.

5. HARQ RTT Timer (Hybrid Automatic Retransmission Request Round-Trip Time): this timer is used for the timing of the least time interval predicted to be used for downlink retransmission of the UE. When a new downlink data transmission is detected, the HARQ RTT Timer is started, and if the received data is correctly decoded upon the expiring of the HARQ RTT Timer, the UE goes into the dormant time and proceeds to the next DRX cycle.

6. DRX retransmission timer: this timer is used for the timing of the time predicted to be needed for downlink retransmission for the UE. When the HARQ RTT Timer expires and there exists data that has not been successfully decoded in the corresponding HARQ buffer, the DRX retransmission timer is started, and this time the PDCCH is listened to.

7. Contention Resolution: once the uplink message contains C-RNTI (Cell Radio Network Temporary Identifier which is allocated by wireless network controller) MAC control element or the uplink message contains CCCH SDU (Common Control Channel Service (CCCH) Data Unit (SDU)), the UE starts a contention resolution timer and monitors the PDCCH until the contention resolution timer expires. When receiving the massage indicating the successful contention resolution, the contention resolution timer is stopped.

8. DRX short cycle timer: when the DRX inactivity timer expires, the DRX short cycle timer is started. If the DRX short cycle timer expires, a long cycle DRX is started. The UE can be configured as short DRX cycle and long DRX cycle. The short DRX cycle is optional. In the case that the short DRX cycle is configured, after entering into the short DRX cycle state, the UE goes into the long DRX cycle if it does not listened its own PDCCH packet after the DRX short cycle timer expires. If the short DRX cycle is not configured, the UE directly goes into the long DRX cycle.

If a DRX MAC (Media Access Control) control information unit is received, it means that the base station requires the UE to go into the dormant state. At this time, the on duration timer and the DRX inactivity timer are stopped, but the time related to the retransmission is not stopped.

With the introduction of CA, a mobile station can simultaneously use a plurality of CCs, which makes the DRX operation environment more complex. In addition, under CA scenarios, the mobile station and the protocol design face the huge challenge of high power consumption. How to make the DRX, which is an important means for saving the power of the mobile station, effectively work under CA scenarios is another issue to be solved.

SUMMARY

The following presents a simplified summary of the invention in order to provide a basic understanding of some aspects of the invention. This summary is not an exhaustive overview of the disclosure. It is not intended to identify key or critical elements of the disclosure or to delineate the scope of the disclosure. Its sole purpose is to present some concepts in a simplified form as a prelude to the more detailed description that is discussed later.

The invention is directed to solve the above technical problem.

According to an aspect of the invention, there is provided a discontinuous reception method in a wireless communication system including determining to employ a consecutive carrier aggregation or a non-consecutive carrier aggregation; in case of the consecutive carrier aggregation, for a primary cell and each of the secondary cells, setting a common on-duration timer (on Duration Timer) and/or a common discontinuous reception inactivity timer (DRX inactivity timer); and in case of the non-consecutive carrier aggregation, for a primary cell and each of the secondary cells, setting separate on-duration timers and/or separate discontinuous reception inactivity timers.

According to another aspect of the invention, there is provided a discontinuous reception method in wireless communication system, carrier activating/deactivating operation separate from the carrier configuration process is used in the wireless communication system, and the method includes: for a primary cell and each of secondary cells, setting a common on-duration timer and/or discontinuous reception inactivity timer.

According to another aspect of the invention, there is provided a mobile station including a determining unit configured to determine to employ a consecutive carrier aggregation or a non-consecutive carrier aggregation; and a setting unit configured to, in case of the consecutive carrier aggregation, set a common on-duration timer and/or a common discontinuous reception inactivity timer for a primary cell and each of secondary cells; and in case of the non-consecutive carrier aggregation, set separate on-duration timers and/or separate discontinuous reception inactivity timers for the primary cell and each of the secondary cells.

According to another aspect of the invention, there is provided a mobile station including an activating/deactivating unit configured to perform carrier activating/deactivating operation separate from the carrier configuration process; and a setting unit configured to set a common on-duration timer and/or discontinuous reception inactivity timer for a primary cell and each of the secondary cells.

According to another aspect of the invention, there is provided a base station including a transmitting unit for sending an instruction to the mobile station to control the mobile station to perform the method mentioned above.

According to another aspect of the invention, there is provided a wireless communication system including the above mobile station and the above base station.

In addition, an embodiment of the invention provides computer program for realizing the above methods.

Furthermore, an embodiment of the invention provides a computer program product in the form of computer readable medium on which there are recorded computer program codes for the above methods.

The invention realizes the discontinuous reception under CA, thereby saving the power of the mobile station.

The above and other advantages of the disclosure can be more apparent with reference to the best mode of the invention in conjunction with the accompanying drawings.

BRIEF DESCRIPTION OF DRAWINGS

The above and other objects, features and advantages of the embodiments of the disclosure can be better understood with reference to the description given below in conjunction with the accompanying drawings, throughout which identical or like components are denoted by identical or like reference signs.

DETAILED DESCRIPTION

Some embodiments of the present disclosure will be described in conjunction with the accompanying drawings hereinafter. It should be noted that the elements and/or features shown in a drawing or disclosed in an embodiments may be combined with the elements and/or features shown in one or more other drawing or embodiments. It should be further noted that some details regarding some components and/or processes irrelevant to the disclosure or well known in the art are omitted for the sake of clarity and conciseness.

Figure 1:
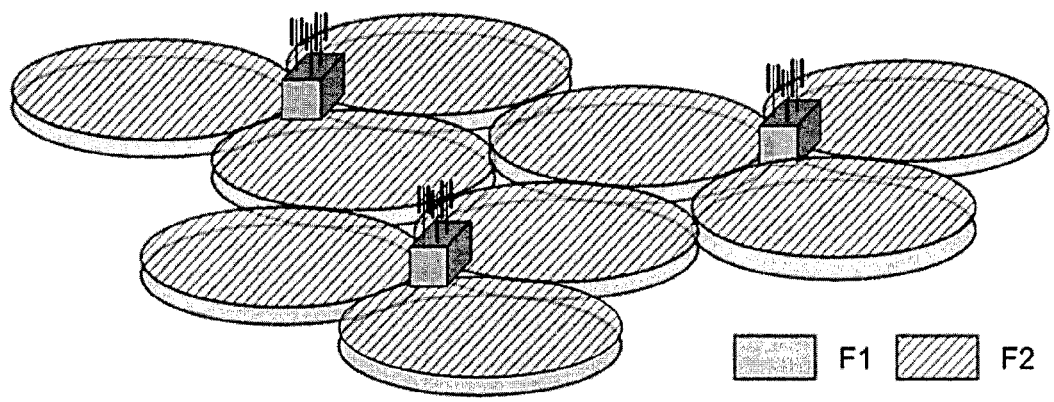
FIG. 1 is a schematic diagram showing a first CA scenario according to the related art.
Figure 2:
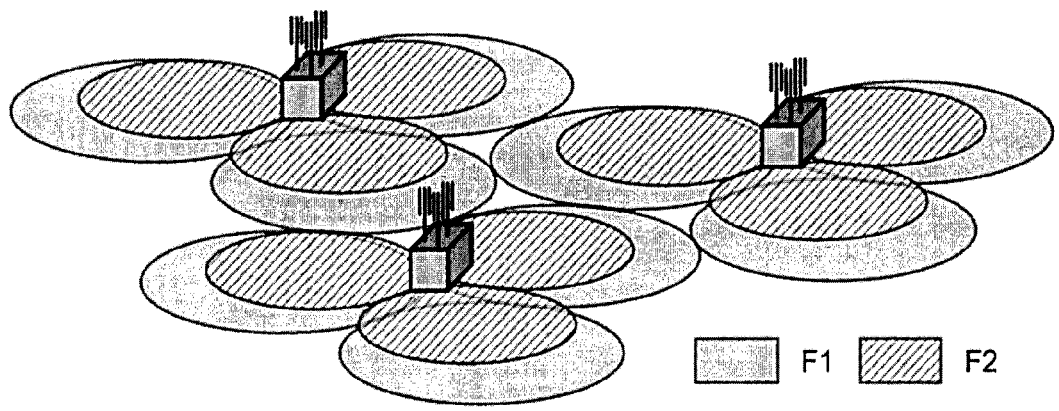
FIG. 2 is a schematic diagram showing a second CA scenario according to the related art.
Figure 3:
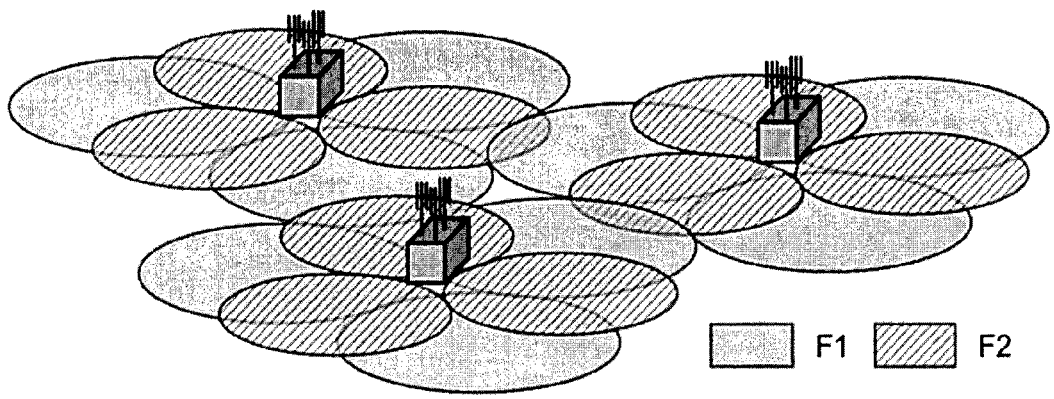
FIG. 3 is a schematic diagram showing a third CA scenario according to the related art.

FIGS. 1, 2, and 3 illustrate application scenarios of the present application. The 3 application scenarios as shown are preferred deployment scenarios for carrier aggregation and represent 3 typical application examples of carrier aggregation. In FIG. 1 the coverage scopes of the cells corresponding to carriers F1 and F2 are substantially coincident, i.e. F1 and F2 provide coverage areas similar to each other. F1 and F2 may be arranged in the same carrier band, which is a typical consecutive CA scenario. FIGS. 2 and 3 each show an example of non-consecutive CA, in which F1 and F2 may be located in different carrier band. The cell corresponding to F1 is used to ensure the coverage and the cell corresponding to F2 is used to improve the throughput. The difference between FIG. 2 and FIG. 3 lies in that, in FIG. 3 the antenna of the cell corresponding to F2 is directed to the edge area of the cell corresponding to F1, therefore the application scenario of FIG. 3 can significantly improve the throughput of the edge area of the cell corresponding to F1.

Figure 4:
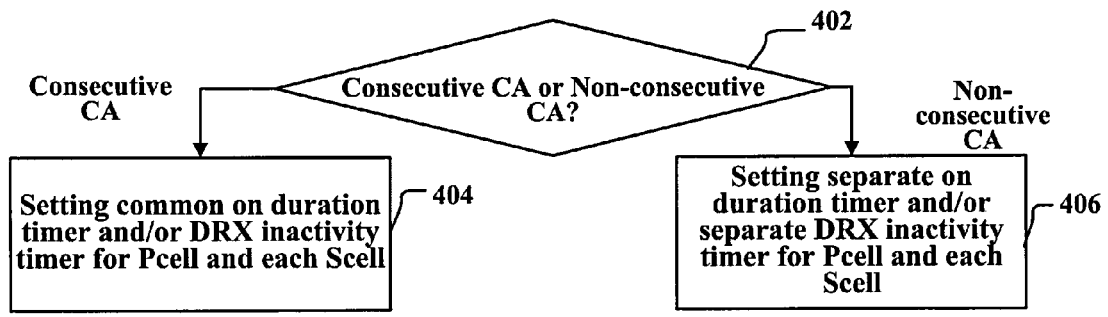
FIG. 4 is a schematic flow chart showing a discontinuous reception method in a wireless communication system according to an embodiment of the invention.

FIG. 4 is a schematic flow chart showing a discontinuous reception method in a wireless communication system according to an embodiment of the invention. The wireless communication system is a CA supporting system. CA can be classified as consecutive CA and non-consecutive CA based on the positions of the aggregated carriers on the spectrum. In consecutive CA, the aggregated CCs are consecutive on the spectrum. In non-consecutive CA, the aggregated CCs are not consecutive on the spectrum.

In step 402, it is determined whether to use the consecutive CA or the non-consecutive CA. In the case of consecutive CA, the processing proceeds to step 404. In the case of non-consecutive CA, the processing proceeds to step 406. In step 404, for the primary cell and each secondary cell, the common on duration timer and/or DRX inactivity timer are set. In step 406, for the primary cell and each secondary cell, separated on Duration Timers and/or separated DRX inactivity timers are set.

In an example, in step 402, whether the mobile station uses consecutive CA or non-consecutive CA may be determined based on signaling from the base station. In steps 404 and 406, the timers can be set based on signaling from the base station.

For consecutive CA, since the aggregated carriers are in the same band, their coverage scopes are substantially the same. Thus, the common on duration timer and/or DRX inactivity timer may be set for the primary cell and each secondary cell. For non-consecutive CA, since the aggregated carriers are in different bands, their propagation characteristics are different from each other. Thus, separated on duration timer and/or separated DRX inactivity timer may be set for the primary cell and each secondary cell.

The DRX on Pcell and DRX on Scell are explained separately below.

I, DRX on Pcell

In the following description, those same with the related art (e.g. LTE Rel-8 standard) are omitted, and only the differences over the related art are described. The DRX operations and the DRX parameter configurations are described below respectively.

1. DRX Operations

In an example, under CA scenario, since there exists cross-scheduling (i.e. the PDCCH of a cell may be used to indicate the data transmission PDCCH of the other cells), if an indication is received over the PDCCH of Pcell indicating new data transmission over other Scells, the timer on the Pcell needs to be started or reset. For example, if the Pcell receives a downlink transmission allocation indicator or uplink transmission authorization containing a Carrier indicator field (CIF), the DRX inactivity timer on Pcell is started or reset, and optionally the Scell corresponding to the CIF may be notified to start or reset its DRX inactivity timer. If PDCCH of the Pcell receives a downlink transmission allocation indicator or uplink transmission authorization excluding a Carrier indicator field (CIF), only the timer on the Pcell is started or reset.

In an example, when processing the contention resolution timer, if the message indicating successful contention resolution is received on only the Pcell, separated contention resolution timers may be set for the PCell and each Scell. Otherwise, a common contention resolution timer may be set for the PCell and each Scell. In an example, if in the wireless communication system the message indicating successful contention resolution is received on only the Pcell, the contention resolution timer of the Pcell is stopped upon receipt of the message indicating successful contention resolution. At this time, the contention resolution timer of the Scell is not affected. As long as the timer on the Pcell does not expire, the PDCCH on the Pcell is monitored. In an example, if wireless communication system does not require the contention resolution message (For example, the contention resolution message for a contention-based random access process (Msg4) to be transmitted over only the Pcell, the contention resolution timer of the Scell is also started when the contention resolution timer of the Pcell is started; When the message indicating successful contention resolution is received on the Pcell or any Scell, the contention resolution timers of the Pcell and Scell are stopped. For example, when the Pcell starts its contention resolution timer (Pcell starts first), a message is sent to the Scells indicating to start the corresponding contention resolution timers. Upon receiving the message, each Scell starts its contention resolution timer. When the message indicating successful contention resolution is received on the Pcell or any Scell, the contention resolution timer of the cell is stopped, and the cell transmits a message to other cells indicating to stop the corresponding contention resolution timers.

In CA scenario, when processing the DRX retransmission timer, it is considered that each CC corresponds to a separate HARQ entity, and the retransmission on the Pcell does not cause the Scell to listen to the PDCCH. Thus, the operations on the DRX retransmission timer of the Pcell do not affect the operations of the DRX retransmission timer on the Scell. The operations of the DRX retransmission timers between the Scells are separate from each other. The start or expiring of the DRX retransmission timer of a Scell does not affect the operations of the DRX retransmission timer of another Scell. Separate DRX retransmission timers may be set for each of the Pcell and Scells.

With respect to the processing of the DRX short cycle timer, since the Pcell is very important in CA and the data transmission thereupon may be frequent, inappropriate configuration of the DRX short cycle timer may cause the mobile station to inappropriately go into long cycle DRX, which may bring about data loss or affect the quality of service. In view of this, in an example, for the DRX on the Pcell, the mobile station does not go into the long cycle DRX even if the DRX short cycle timer expires.

2. DRX Parameter Configurations

DRX parameter configurations are described. The parts that are the same with LTE Rel-8 in the related art are omitted.

In an example, in the case of consecutive CA, the DRX parameters of the primary cell and each secondary cell may be set as the same values. It is to be noted that the expression "set as the same values" means that the same parameters, which the primary cell and each secondary cell each have, are set as the same values. In some cases, for example, the primary cell may have not a parameter, e.g. Long DRX cycle, while the secondary cell may have this parameter. The interpretation may also be applied to the following description. In the case of non-consecutive CA, the DRX parameters of the primary cell and each secondary cell may be set as different values.

DRX inactivity timer: in an example, the parameter may be adjusted dynamically according to one or more conditions of the data amount to be transmitted by the mobile station, the position of the mobile station, the moving velocity, the signal quality and the coverage scope of the Pcell and the like. The parameter may be set as relatively small in at least one of the following cases: the data amount to be transmitted by the mobile station is small, the mobile station is relatively near to the base station, the signal quality is relatively good, and the moving velocity is relatively small with respect to the coverage. Otherwise, the parameter may be set as relatively large.

DRX short cycle timer: in an example, the value may be set regardless of the DRX performance of the Pcell since the Pcell does not contain long cycle DRX.

Long DRX cycle: in an example, the value may be not set since the Pcell does not contain long cycle DRX.

On Duration Timer: in an example, the parameter may be adjusted dynamically according to one or more conditions of the data amount to be transmitted by the mobile station, the position of the mobile station, the moving velocity, the signal quality and the coverage scope of the Pcell and the like. The parameter may be set as relatively small in at least one of the following cases: the data amount to be transmitted by the mobile station is small, the mobile station is relatively near to the base station, the signal quality is relatively good, and the moving velocity is relatively small with respect to the coverage. Otherwise, the parameter may be set as relatively large.

DRX cycle: in an example, the parameter may be adjusted dynamically according to one or more conditions of the data amount to be transmitted by the mobile station, the position of the mobile station, the moving velocity, the signal quality and the coverage scope of the Pcell and the like. The parameter may be set as relatively small in at least one of the following cases: the data amount to be transmitted by the mobile station is small, the mobile station is relatively near to the base station, the signal quality is relatively good, and the moving velocity is relatively small with respect to the coverage. Otherwise, the parameter may be set as relatively large.

CQI/PMI/RI (Channel Quality Indicator/Pre-coding Matrix Index/Rate Indicator) reports: in existed LTE Rel-8, the time periods for transmitting these feedback reports may be configured, for example they may be transmitted during the active time or the on duration time. The performance of the Pcell significantly affects the overall performance of CA, thus obtaining the feedback reports in time is very important. In an example of the embodiment, in the Pcell, these feedback reports are periodically sent as long as the mobile station is in the active time.

II, DRX on Scell

In the following description, those same with the related art (e.g. LTE Rel-8 standard) are omitted, and only the differences over the related art are described. The DRX operations and the DRX parameter configurations are described below respectively. The DRX operations on each Scell may be performed independently, and the DRX parameters of the Scells may be the same or be different from each other as required in the different scenarios.

1. DRX Operations

In an example, in CA scenario, in the case of cross-scheduling, if a Scell does not configure PDCCH, there is not DRX on this Scell, that is, DRX configuration is not performed on this Scell.

In an example, after the Scell receives a downlink transmission allocation indication or uplink transmission authorization containing a carrier indicator field (CIF), the DRX inactivity timer of the Scell is started or reset, and optionally the Scell may notify the other cell corresponding to the CIF to start or reset its DRX inactivity timer. If the Scell receives a downlink transmission allocation indication or uplink transmission authorization not containing a carrier indicator field (CIF), only the DRX inactivity timer of this Scell is started or reset.

In an example, in CA scenario, if a Scell receives a start contention resolution timer message from the Pcell, this timer is start, and the PDCCH over the Scell is monitored. When receiving a stop contention resolution timer message from the Pcell or the other Scell, the Scell stops its contention resolution timer. If the Scell receives a message indicating successful contention resolution, it stops its contention resolution timer, and notifies the Pcell and the other Scells to stop their corresponding contention resolution timers.

In an example, the processing of the DRX retransmission timers between Scells may be independent with each other.

2. DRX Parameter Configurations

DRX parameter configurations are described below. The parts that are the same with the existed LTE Rel-8 are omitted. DRX parameters may include the expiring times of the timers, such as DRX inactivity timer, DRX short cycle timer, and on duration timer, in the DRX; the time length of the DRX cycle and the cycle of transmitting the feedback reports. In the following, the expiring time of a timer is also simplified as this timer.

In an example, the parameters of the Pcell and each Scell can be the same or different from each other as required by the different scenarios. The policies of parameter configurations under different scenarios are described below.

If the mobile station is under the consecutive CA scenario, as shown in FIG. 1, since the position of the mobile station is determined and the coverage scopes of the carriers are the same, the relative signal quality of the Pcell and Scells are the same, regardless of their absolute signal quality. Thus the DRX parameter configurations of the Pcell and the Scells may be the same. That is, it is unnecessary to set different values for the DRX parameters of the Pcell and the Scells.

In the case that the mobile station is in non-consecutive CA scenario, As shown in FIGS. 2 and 3, since the coverage scopes of the carriers are different from each other, the mobile station is within the coverage of the good quality signal of the Pcell, but can not be ensured to be within the coverage of the good quality signal of the Scells. Therefore, the DRX parameter configurations between Scells and Pcell and between Scells are preferred to be separate from each other. DRX parameters can be configured separately according to the network deployment and the position of the mobile station.

DRX inactivity timer: the parameter may be adjusted dynamically according to one or more conditions of the data amount to be transmitted by the mobile station, the position of the mobile station, the moving velocity, the signal quality and the coverage scope of the Scell and the like. The parameter may be set as relatively small in at least one of the following cases: the data amount to be transmitted by the mobile station is small, the mobile station is relatively near to the base station, the signal quality is relatively good, and the moving velocity is relatively small with respect to the coverage. Otherwise, the parameter may be set as relatively large.

DRX short cycle timer: the parameter may be adjusted dynamically according to one or more conditions of the data amount to be transmitted by the mobile station, the position of the mobile station, the moving velocity, the signal quality and the coverage scope of the Scell and the like. The parameter may be set as relatively small in at least one of the following cases: the data amount to be transmitted by the mobile station is small, the mobile station is relatively near to the base station, the signal quality is relatively good, and the moving velocity is relatively small with respect to the coverage. Otherwise, the parameter may be set as relatively large.

On Duration Timer: the parameter may be adjusted dynamically according to one or more conditions of the data amount to be transmitted by the mobile station, the position of the mobile station, the moving velocity, the signal quality and the coverage scope of the Pcell and the like. The parameter may be set as relatively small in at least one of the following cases: the data amount to be transmitted by the mobile station is small, the mobile station is relatively near to the base station, the signal quality is relatively good, and the moving velocity is relatively small with respect to the coverage. Otherwise, the parameter may be set as relatively large.

DRX Cycle: the parameter may be adjusted dynamically according to one or more conditions of the data amount to be transmitted by the mobile station, the position of the mobile station, the moving velocity, the signal quality and the coverage scope of the Pcell and the like. The parameter may be set as relatively small in at least one of the following cases: the data amount to be transmitted by the mobile station is small, the mobile station is relatively near to the base station, the signal quality is relatively good, and the moving velocity is relatively small with respect to the coverage. Otherwise, the parameter may be set as relatively large.

Figure 5:
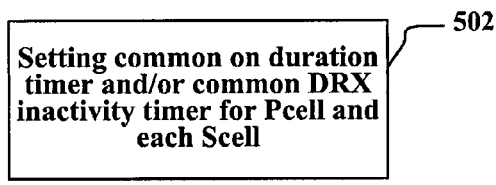
FIG. 5 is a schematic flow chart showing a discontinuous reception method in a wireless communication system according to another embodiment of the invention.

CQI/PMI/RI reports: in existed LTE Rel-8, the time periods for transmitting these feedback reports may be configured, for example they may be transmitted during the active time or the on duration time. These reports are very important for canceling the Scell that cannot meet the transmission quality requirements and thus may be dynamically adjusted based on the signal qualities of the Scells. In an example, if the signal qualities of the Scells are low, these feedback reports are periodically sent in the active time; otherwise, these reports are periodically sent only in the on-duration time FIG. 5 is a schematic flow chart showing a discontinuous reception method in a wireless communication system according to another embodiment. The wireless communication system is a CA supporting system. In the wireless communication system, the activating/deactivating operations are separate with the carrier configuration processes.

FIG. 5 involves step 502. In step 502, for the primary cell and each secondary cell, a common on Duration timer and/or a common DRX inactivity timer are set.

When a carrier is not in use at a certain time, it can be activated optionally, rather than being set into the non-configured state. In this way, when the carrier needs to be reused, it can be simply reactivated without the need of reconfiguring it. This can not only save the signaling overhead due to the frequent reconfiguration, but also flexibly select the carrier to be activated, thereby further reducing the power consumption of the mobile station. In combination with the activating/deactivating commands, the DRX complexity under CA can be reduced. In the wireless communication system utilizing carrier activating/deactivating operations that are separate from the carrier configuration process, a common on Duration timer and/or a common DRX inactivity timer may be set for the primary cell and each secondary cell.

In an example, if the message indicating the successful contention resolution is received on only the Pcell, separate contention resolution timers may be set for the primary cell and each secondary cell, otherwise, a common contention resolution timer may be set for the primary cell and each secondary cell.

In an example, separate DRX retransmission timers may be set for the primary cell and each secondary cell.

In an example, DRX parameters of the primary cell and each secondary cell configurations.

In an example, if it is determined that a cell or some cells are not needed based on the data amount to be transmitted, the position of the mobile station, the moving velocity, the signal quality and the carrier coverage and the like, the cell or cells are deactivated and the DRX processes on the cell or cells are accordingly terminated, and at this time, the PDCCH corresponding to the cell or cells need not be monitored. If a cell or cells need to be reactivated as required, it is judged, based on the DRX running rules, whether the PDCCH corresponding to the cell or cells need to be monitored, and when it is judged that the PDCCH corresponding to the cell or cells need to be monitored, the PDCCH corresponding to the cell or cells is monitored.

It is to be noted that the embodiment shown in FIG. 4 may also be applied to the wireless communication system utilizing DRX with activating/deactivating processes.

Figure 6:
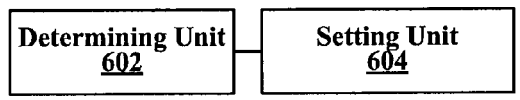
FIG. 6 is a schematic block diagram showing a mobile station according to an embodiment of the invention.

FIG. 6 is a schematic block diagram showing a mobile station 600 according to an embodiment of the invention. The mobile station 600 includes a determining unit 602 configured to determine whether to employ consecutive CA or non-consecutive CA; and a setting unit 604 configured to: in case of the consecutive carrier aggregation, set a common on-duration timer and/or a common discontinuous reception inactivity timer for a primary cell and each of secondary cells; and in case of the non-consecutive carrier aggregation, set separate on-duration timers and/or separate discontinuous reception inactivity timers for the primary cell and each of the secondary cells.

In an example, the mobile station 600 further includes a receiving unit (not shown). When the receiving unit receives, over the PDCCH of Pcell, an indication indicating new data transmission over other Scells, the setting unit 604 starts or resets the DRX inactivity timer of the Pcell.

In an example, if the receiving unit receives, over the Pcell or Scell, a downlink transmission allocation indicator or uplink transmission authorization containing a Carrier indicator field (CIF), the setting unit 604 starts or resets the DRX inactivity timer of the Pcell or Scell, and starts or resets the DRX inactivity timer of the Scell corresponding to the CIF. When the receiving unit receives, over the Pcell or Scell, a downlink transmission allocation indicator or uplink transmission authorization excluding a Carrier indicator field (CIF), the setting unit 604 starts or resets only the DRX inactivity timer of the Pcell or Scell.

In an example, the mobile station 600 further includes a receiving unit (not shown). If the receiving unit receives the message indicating the successful contention resolution only over the Pcell, the setting unit 604 sets separate contention resolution timers for the Pcell and each Scell. Otherwise, the setting unit 604 sets a common contention resolution timer for the Pcell and each Scell.

In an example, the mobile station 600 further includes a receiving unit (not shown). If the message indicative of the successful contention resolution is received only over the Pcell by the receiving unit, the setting unit 604 stops the contention resolution timer of the Pcell when the message indicative of the successful contention resolution is received by the receiving unit. If the message indicative of the successful contention resolution is not only received over the Pcell by the receiving unit, when starting the contention resolution timer of the Pcell, the setting unit 604 further starts the contention resolution timer of the Scell. The setting unit 604 stops the contention resolution timers of the Pcell and the Scell when the message indicative of the successful contention resolution is received by the receiving unit over the primary cell or over any of the secondary cells. Optionally, the setting unit 604 sends a message of starting the contention resolution timer from the Pcell to the Scell, and when the Scell receives the message of starting the contention resolution timer from the Pcell, the setting unit 604 starts the contention resolution timer of the Scell. When the receiving unit receives the message indicating the successful contention resolution over the Pcell or any of the Scells, the setting unit 604 stops the contention resolution timer of the cell, and sends a message of stopping the contention resolution timers to the other cells. The other cells stop their contention resolution timers upon receipt of the message.

In an example, the setting unit 604 sets separate discontinuous reception retransmission timers for the Pcell and each Scell.

In an example, the setting unit 604, in case of the consecutive carrier aggregation, sets the same value for DRX parameters of the Pcell and each of Scells; and in case of the non-consecutive carrier aggregation, sets different values for DRX parameters of the Pcell and each of the Scells.

In an example, the setting unit 604 still causes the mobile station to go into the short cycle DRX state in the case the DRX short cycle timer of the Pcell expires.

In an example, in case of at least one of the following: the data to be transmitted being of smaller amount, being closer to the base station, having better signal quality, and the moving speed of the mobile station being smaller with respect to the converge area of the cell, the setting unit 604 sets a smaller expiring time value of DRX inactivity timer for the cell and/or a smaller expiring time value of on-duration timer for the cell, and/or sets a bigger DRX cycle for the cell.

In an example, the setting unit 604 sets the expiring time value of the DRX short cycle timer for the Pcell, regardless of the discontinuous reception performance of the Pcell.

In an example, the setting unit 604 does not set the DRX long cycle timer for the Pcell.

In an example, the mobile station further includes a feedback report transmitting unit (not shown) configured to send periodically feedback reports for the Pcell during the active time.

In an example, the mobile station further includes a feedback report transmitting unit (not shown), wherein in case that the Scell has poor signal quality, the feedback report transmitting unit sends periodically a feedback report for the Scell during active time, otherwise the feedback report transmitting unit sends the feedback report for the Scell only during the on-duration time.

In an example, the setting unit 604 does not perform DRX configuration for the Scell which has no configured PDCCH.

In an example, in case of at least one of following: the data to be transmitted being of smaller amount, being closer to the base station, having better signal quality, and the moving speed of the mobile station is smaller with respect to the converge area of the cell, the setting unit 604 sets a smaller DRX short cycle timer for the Scell.

For the functions and operations of the components of the mobile station 600, reference may be made to the embodiment shown in FIG. 4, the description of which is not repeated.

Figure 7:
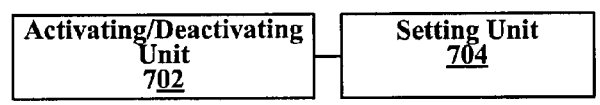
FIG. 7 is a schematic block diagram showing a mobile station according to an embodiment of the invention.

FIG. 7 is a schematic block diagram showing a mobile station TOO according to an embodiment of the invention. The mobile station 700 includes an activating/deactivating unit 702 configured to perform carrier activating/deactivating operation separate from the carrier configuration process; and a setting unit 704 configured to set a common on-duration timer and/or DRX inactivity timer for a Pcell and each of the Scells.

In an example, the mobile station 700 further includes a receiving unit (not shown). If the receiving unit receives the message indicating the successful contention resolution only over the Pcell, the setting unit 704 sets separate contention resolution timers for the Pcell and each Scell. Otherwise, the setting unit 704 sets a common contention resolution timer for the Pcell and each Scell.

In an example, the setting unit 704 sets separate DRX retransmission timers for the Pcell and each Scell.

In an example, the setting unit 704 sets the same DRX parameter values for the Pcell and each Scell.

In an example, the mobile station 700 further includes a receiving unit (not shown). After the activating/deactivating unit 702 deactivates a cell, the receiving unit does not monitor the PDCCH corresponding to the cell and after the activating/deactivating unit 702 reactivates a cell that has been deactivated, the setting unit 704 judges whether to monitor the PDCCH corresponding to the cell based on the DRX running rules. When the setting unit 704 judges that the PDCCH corresponding to the cell needs to be monitored, the receiving unit monitors the PDCCH corresponding to the cell.

In the above description, some embodiments of the invention are described from the view point of the mobile station. Those skilled in the art can appreciate, the steps in the method shown in the embodiments described with referenced to FIGS. 4-7 may be performed by the mobile station under the control of the base station.

For the functions and operations of the components of the mobile station 700, reference may be made to the embodiment shown in FIG. 5, the description of which is not repeated.

Figures 8, 9:
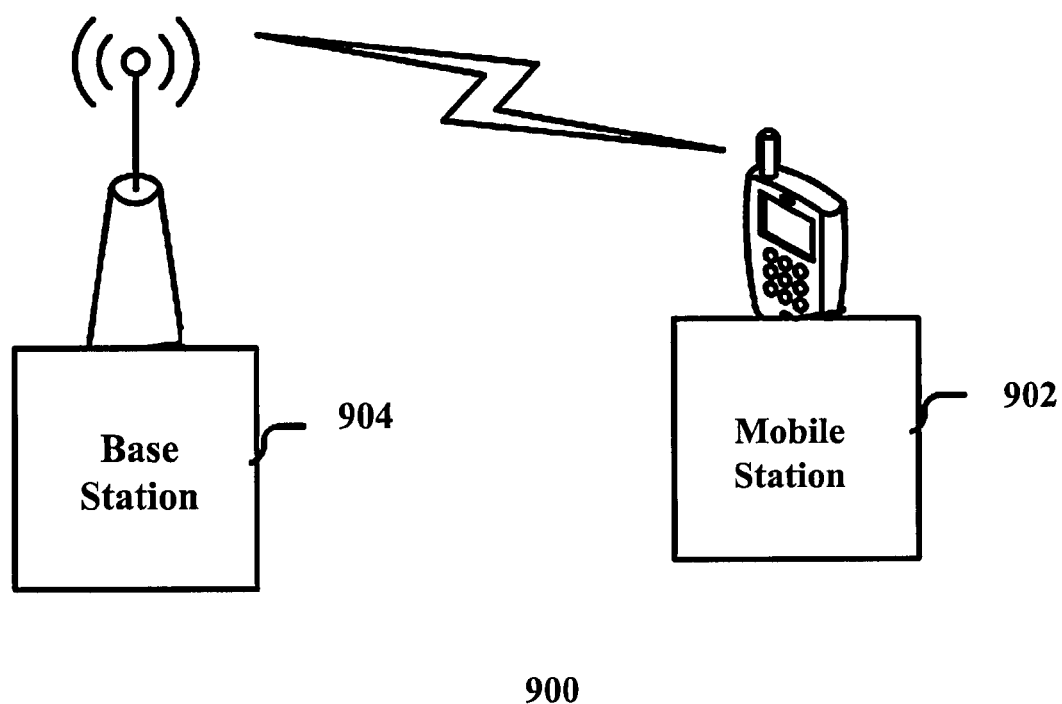
FIG. 8 is a schematic block diagram showing a base station according to an embodiment of the invention.
FIG. 9 is a schematic block diagram showing a wireless communication system according to an embodiment of the invention.

FIG. 8 is a schematic block diagram showing a base station 800 according to an embodiment of the invention. The base station 800 includes a transmitting unit 802 configured to send a command to the mobile station, to control the mobile station to perform the method described with reference to FIG. 4 or 5.

FIG. 9 is a schematic block diagram showing a wireless communication system 900 according to an embodiment of the invention. The wireless communication system 900 includes the mobile station 902 described with reference to FIG. 6 or 7 and the base station 904 described with reference to FIG. 8.

Those skilled in the art can understand that the above embodiments and examples are illustrative. The present disclosure should not be regarded as being limited to any particular embodiments or examples stated above.

In the disclosure, the expressions, such as "the first", "the second", and "the Nth" are used. Those skilled in the art will appreciate that such expressions are used merely to differentiate the terms in literal so as to describe the invention clearly, and should not be considered as defining the sequence or the like of the terms.

As an example, the component modules, units or steps in the above apparatuses and methods can be configured with software, hardware, firmware or any combination thereof in the base station (e.g. eNodeB) or mobile station node (e.g. the UE) of the communication system, as part of the physical layer apparatus of the base station or the mobile station. The components, units or steps in the above apparatuses and methods can be configured with software, hardware, firmware or any combination thereof by using any appropriate means or manners known in the art, the description of which is not detailed herein.

As can be understood, a system including the above apparatuses according to any of the above embodiments should also be encompassed in the protection scope of the invention.

Figure 10:
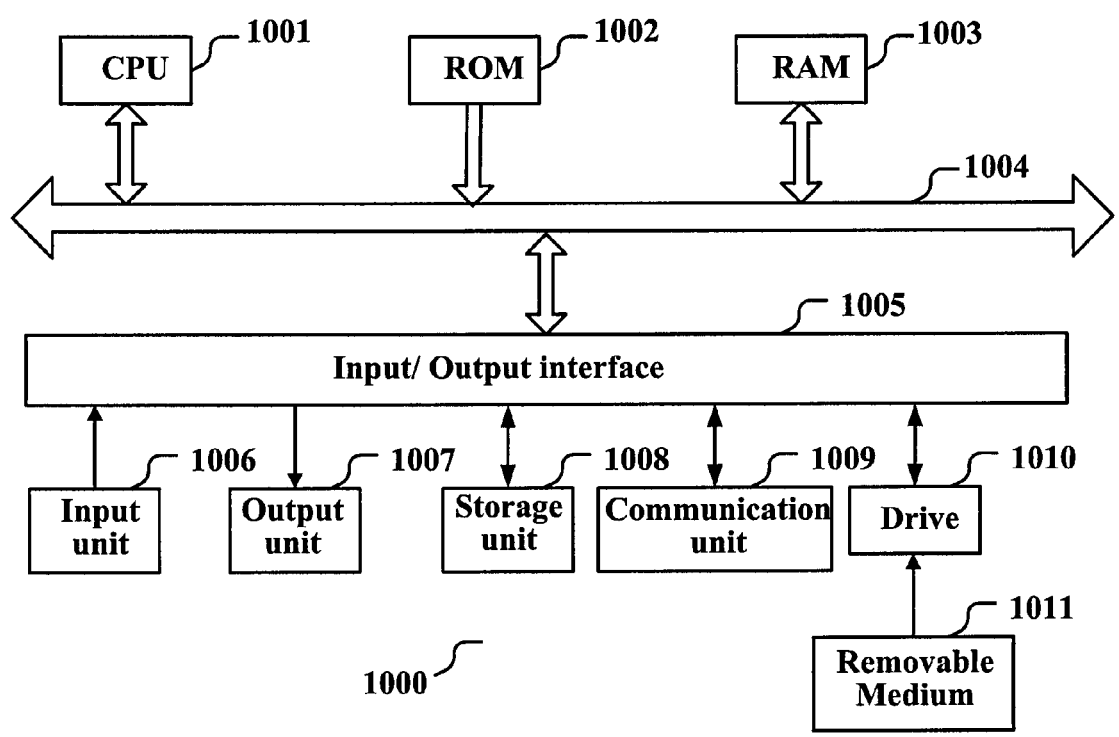
FIG. 10 is a schematic block diagram showing the structure of a computer realizing embodiments of the invention.

As an example, in the case of using software or firmware, programs constituting the software for realizing the above method or apparatus can be installed to a computer with a specialized hardware structure (e.g. the general purposed computer 1000 as shown in FIG. 10) from a storage medium or a network. The computer, when installed with various programs, is capable of carrying out various functions.

In FIG. 10, a central processing unit (CPU) 1001 executes various types of processing in accordance with programs stored in a read-only memory (ROM) 1002, or programs loaded from a storage unit 1008 into a random access memory (RAM) 1003. The RAM 1003 also stores the data required for the CPU 1001 to execute various types of processing, as required. The CPU 1001, the ROM 1002, and the RAM 1003 are connected to one another through a bus 1004. The bus 1004 is also connected to an input/output interface 1005.

The input/output interface 1005 is connected to an input unit 1006 composed of a keyboard, a mouse, etc., an output unit 1007 composed of a cathode ray tube or a liquid crystal display, a speaker, etc., the storage unit 1008, which includes a hard disk, and a communication unit 1009 composed of a modem, a terminal adapter, etc. The communication unit 1009 performs communicating processing. A drive 1010 is connected to the input/output interface 1005, if needed. In the drive 1010, for example, removable media 1011 is loaded as a recording medium containing a program of the present invention. The program is read from the removable media 1011 and is installed into the storage unit 1008, as required.

In the case of using software to realize the above consecutive processing, the programs constituting the software may be installed from a network such as Internet or a storage medium such as the removable media 1011.

Those skilled in the art should understand the storage medium is not limited to the removable media 1011, such as, a magnetic disk (including flexible disc), an optical disc (including compact-disc ROM (CD-ROM) and digital versatile disk (DVD)), an magneto-optical disc (including an MD (Mini-Disc) (registered trademark)), or a semiconductor memory, in which the program is recorded and which are distributed to deliver the program to the user aside from a main body of a device, or the ROM 1002 or the hard disc involved in the storage unit 1008, where the program is recorded and which are previously mounted on the main body of the device and delivered to the user.

The present disclosure further provides a program product having machine-readable instruction codes which, when being executed, may carry out the methods according to the embodiments.

Accordingly, the storage medium for bearing the program product having the machine-readable instruction codes is also included in the disclosure. The storage medium includes but not limited to a flexible disk, an optical disc, a magneto-optical disc, a storage card, or a memory stick, or the like.

In the above description of the embodiments, features described or shown with respect to one embodiment may be used in one or more other embodiments in a similar or same manner, or may be combined with the features of the other embodiments, or may be used to replace the features of the other embodiments.

As used herein, the terms the terms "comprise," "include," "have" and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Further, in the disclosure the methods are not limited to a process performed in temporal sequence according to the order described therein, instead, they can be executed in other temporal sequence, or be executed in parallel or separatively. That is, the executing orders described above should not be regarded as limiting the method thereto.

While some embodiments and examples have been disclosed above, it should be noted that these embodiments and examples are only used to illustrate the present disclosure but not to limit the present disclosure. Various modifications, improvements and equivalents can be made by those skilled in the art without departing from the scope of the present disclosure. Such modifications, improvements and equivalents should also be regarded as being covered by the protection scope of the present disclosure.

The invention claimed is:

1. An electronic device, comprising
circuitry configured to:
   communicate with a base station on a primary cell;
   activate or deactivate a secondary component carrier corresponding to a secondary cell which provides transmission resource for carrier aggregation based on an activation/deactivation command from the base station;
   start a common Contention Resolution Timer for a contention based random access procedure for the primary cell; and
   receive information indicating contention resolution success on at least one of the primary cell and the secondary cell if activated; and
   receive a MAC signaling as the activation/deactivation command and control activating or deactivating the secondary component carrier based on the MAC signaling.

2. The electronic device according to claim 1, wherein the circuitry is further configured to:
   monitor a physical downlink control channel of the secondary cell based on a discontinuous reception operation if the secondary component carrier is active and not monitor the physical downlink control channel of the secondary cell if the secondary component carrier is deactivated; and monitor a physical downlink control channel of the primary cell based on the discontinuous reception operation.

3. The electronic device according to claim 2, wherein the circuitry is further configured to start or reset an on Duration Timer and/or a DRX inactivity timer for both of the secondary cell and primary cell.

4. The electronic device according to claim 2, wherein the circuitry is further configured to configure common DRX parameters for the secondary cell and primary cell.

5. The electronic device according to claim 4, wherein the circuitry is further configured to receive a signaling from the base station and configure the common on Duration Timer and/or the common discontinuous reception inactivity timer based on the signaling.

6. The electronic device according to claim 4, wherein the DRX parameters comprises at least one of on Duration Timer, DRX inactivity timer, DRX Retransmission Timer, Long DRX Cycle and DRX Short Cycle timer and DRX Short Cycle.

7. The electronic device according to claim 1, wherein the circuitry is further configured to:
stop the common Contention Resolution Timer based on the information indicating contention resolution success received on any of the primary cell or the secondary cell.

8. The electronic device according to claim 1, wherein the electronic device is a user equipment and further comprises a transceiver which is configured to receive signals on a plurality of physical downlink control channels of a plurality of cells based on corresponding DRX configurations.

9. A method, comprising:
communicating with a base station on a primary cell;
activating or deactivating, using circuitry, a secondary component carrier corresponding to a secondary cell which provides transmission resource for carrier aggregation based on an activation/deactivation command from the base station;
starting a common Contention Resolution Timer for a contention based random access procedure for the primary cell;
receiving information indicating contention resolution success on at least one of the primary cell and the secondary cell if activated; and
receiving a MAC signaling as the activation/deactivation command and controlling activating or deactivating the secondary component carrier based on the MAC signaling.

10. The method according to claim 9, further comprising:
monitoring a physical downlink control channel of the secondary cell based on a discontinuous reception operation if the secondary component carrier is activated and not monitoring the physical downlink control channel of the secondary cell if the secondary component carrier is deactivated; and
monitoring a physical downlink control channel of the primary cell based on the discontinuous reception operation.

11. The method according to claim 10, further comprising:
starting or resetting an on Duration Timer and/or a DRX inactivity timer for both of the secondary cell and primary cell.

12. The method according to claim 10, further comprising:
configuring common DRX parameters for the secondary cell and the primary cell.

13. The method according to claim 12, further comprising:
receiving a signaling from the base station and configure the common on Duration Timer and/or the common discontinuous reception inactivity timer based on the signaling.

14. The method according to claim 12, wherein the DRX parameters comprise at least one of on Duration Timer, DRX inactivity timer, DRX Retransmission Timer, Long DRX Cycle and DRX Short Cycle timer and DRX Short Cycle.

15. The method according to claim 9, further comprising:
stopping the common Contention Resolution Timer based on the information indicating contention resolution success received on any of the primary cell or the secondary cell.

16. The method according to claim 9, further comprising:
starting or resetting a DRX Inactivity Timer of the secondary cell which is indicated in a carrier indicator field received via another cell.

17. A non-transitory computer readable medium encoded with computer-readable instructions thereon, the compute-readable instructions, when executed by a computer, cause the computer to perform a method comprising:
communicating with a base station on a primary cell;
activating or deactivating a secondary component carrier corresponding to a secondary cell which provides transmission resource for carrier aggregation based on an activation/deactivation command from the base station;
starting a common Contention Resolution Timer for a contention based random access procedure for the primary cell;
receiving information indicating contention resolution success on at least one of the primary cell and the secondary cell if activated; and
receiving a MAC signaling as the activation/deactivation command and controlling activating or deactivating the secondary component carrier based on the MAC signaling.

18. The non-transitory computer readable medium according to claim 17, wherein the compute-readable instructions, when executed by a computer, cause the computer to perform a method further comprising:
monitoring a physical downlink control channel of the secondary cell based on a discontinuous reception operation if the secondary component carrier is activated and not monitoring the physical downlink control channel of the secondary cell if the secondary component carrier is deactivated;
monitoring a physical downlink control channel of the primary cell based on the discontinuous reception operation; and
configuring common DRX parameters for the secondary cell and primary cell.

19. An electronic device, comprising:
circuitry configured to
communicate with a user equipment on a primary cell;
generate an activation/deactivation command for the user equipment to activate or deactivate a secondary component carrier corresponding to a secondary cell which provides transmission resource for carrier aggregation; and
transmit to the user equipment, for a contention based random access procedure for the primary cell, information indicating contention resolution success on at least one of the primary cell and the secondary cell if activated, wherein
the user equipment starts a common Contention Resolution Timer for the primary cell, and stops the common Contention Resolution Timer based on information indicating contention resolution success received on any of the primary cell and the secondary cell, and the circuitry is further configured to transmit a MAC signaling as the activation/deactivation command to the user equipment for activating or deactivating the secondary component carrier.

20. A method comprising:

communicating with a user equipment on a primary cell;

generating an activation/deactivation command for the user equipment to activate or deactivate a secondary component carrier corresponding to a secondary cell which provides transmission resource for carrier aggregation; and transmitting to the user equipment, for a contention based random access procedure for the primary cell, information indicating contention resolution success on at least one of the primary cell and the secondary cell if activated, wherein the user equipment starts a common Contention Resolution Timer for the primary cell, and stops the common Contention Resolution Timer based on the information indicating contention resolution success received on any of the primary cell and the secondary cell, and the method further comprises transmitting a MAC signaling as the activation/deactivation command to the user equipment for activating or deactivating the secondary component carrier.

* * * * *